US011984742B2

(12) United States Patent
Sanchez

(10) Patent No.: US 11,984,742 B2
(45) Date of Patent: *May 14, 2024

(54) SMART RING POWER AND CHARGING

(71) Applicant: BlueOwl, LLC, San Francisco, CA (US)

(72) Inventor: Kenneth Jason Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 16/926,262

(22) Filed: Jul. 10, 2020

(65) Prior Publication Data
US 2023/0361588 A1 Nov. 9, 2023

Related U.S. Application Data

(60) Provisional application No. 62/992,328, filed on Mar. 20, 2020, provisional application No. 62/877,391, filed on Jul. 23, 2019.

(51) Int. Cl.
*H02J 7/00* (2006.01)
*A44C 9/00* (2006.01)
(Continued)

(52) U.S. Cl.
CPC ....... *H02J 7/0045* (2013.01); *A44C 9/0053* (2013.01); *H02J 7/00032* (2020.01);
(Continued)

(58) Field of Classification Search
CPC .................................. H02J 7/0045
(Continued)

(56) References Cited

U.S. PATENT DOCUMENTS 6,097,480 A 8/2000 Kaplan
6,154,658 A 11/2000 Caci
(Continued)

FOREIGN PATENT DOCUMENTS

CN 104799509 A 7/2015
CN 105841851 A 8/2016
(Continued)

OTHER PUBLICATIONS

"How to find your ideal bedtime with the Oura app", available online at <https://web.archive.org/web/20191206205332/https://ouraring.com/how-to-find-your-ideal-bedtime-with-the-oura-app/ 2019, 8 pages.
(Continued)

*Primary Examiner* — Yalkew Fantu
(74) *Attorney, Agent, or Firm* — BRYAN CAVE LEIGHTON PAISNER LLP

(57) ABSTRACT

A smart ring may be configured with a removable power source and an internal power source. The internal power source may enable continued operation of the smart ring disposed at a finger of a user, while the removable power source may be detached from the smart ring for charging or to be replaced with another charged removable power source. The removable power source may be disposed as a platform at an outer surface of a band-shaped housing of the smart ring, for example, via an adapter.

20 Claims, 6 Drawing Sheets

(51) Int. Cl.
*H02J 7/02* (2016.01)
*H02J 50/00* (2016.01)
*H02J 50/10* (2016.01)

(52) U.S. Cl.
CPC .............. *H02J 7/02* (2013.01); *H02J 50/001* (2020.01); *H02J 50/10* (2016.02)

(58) Field of Classification Search
USPC ........................................................ 320/108
See application file for complete search history.

(56) References Cited

U.S. PATENT DOCUMENTS

| | | | |
|---|---|---|---|
| 6,560,993 | B1 | 5/2003 | Bosque et al. |
| 7,013,674 | B2 | 3/2006 | Kretchmer |
| 7,500,746 | B1 | 3/2009 | Howell et al. |
| 7,872,444 | B2 | 1/2011 | Hamilton et al. |
| 8,075,484 | B2 | 12/2011 | Moore-Ede |
| 8,446,275 | B2 | 5/2013 | Utter, II |
| 8,570,273 | B1 | 10/2013 | Smith |
| 9,248,839 | B1 | 2/2016 | Tan |
| 9,362,775 | B1 | 6/2016 | Jacobs |
| 9,420,260 | B2 | 8/2016 | McGregor et al. |
| 9,440,657 | B1 | 9/2016 | Fields et al. |
| 9,477,146 | B2 | 10/2016 | Xu et al. |
| 9,509,170 | B2 | 11/2016 | Wu |
| 9,628,707 | B2 | 4/2017 | Blum et al. |
| 9,660,488 | B2 | 5/2017 | Breedvelt-Schouten et al. |
| 9,696,690 | B2 | 7/2017 | Nguyen et al. |
| 9,711,060 | B1 | 7/2017 | Lusted et al. |
| 9,711,993 | B2 | 7/2017 | Kim |
| 9,717,949 | B1 | 8/2017 | Tran et al. |
| 9,756,301 | B2 | 9/2017 | Li et al. |
| 9,847,020 | B2 | 12/2017 | Davis |
| 9,861,314 | B2 | 1/2018 | Haverinen et al. |
| 9,908,530 | B1 | 3/2018 | Fields et al. |
| 9,931,976 | B1 | 4/2018 | Terwilliger et al. |
| 9,955,286 | B2 | 4/2018 | Segal |
| 9,956,963 | B2 | 5/2018 | Kumar et al. |
| 9,965,761 | B2 | 5/2018 | Elangovan et al. |
| 10,007,355 | B2 | 6/2018 | Schorsch et al. |
| 10,085,695 | B2 | 10/2018 | Ouwerkerk et al. |
| 10,099,608 | B2 | 10/2018 | Cuddihy et al. |
| 10,102,510 | B2 | 10/2018 | Yau et al. |
| 10,137,777 | B2 | 11/2018 | Lu et al. |
| 10,315,557 | B2 | 6/2019 | Terwilliger et al. |
| 10,317,940 | B2 | 6/2019 | Eim et al. |
| 10,359,846 | B2 | 7/2019 | Priyantha et al. |
| 10,366,220 | B2 | 7/2019 | Shapiro et al. |
| 10,396,584 | B2 | 8/2019 | Madau et al. |
| 10,409,327 | B2 | 9/2019 | Stotler |
| 10,444,834 | B2 | 10/2019 | Vescovi et al. |
| 10,463,141 | B2 | 11/2019 | Fitzgerald et al. |
| 10,629,175 | B2 | 4/2020 | Yan et al. |
| 10,664,842 | B1 | 5/2020 | Bermudez et al. |
| 10,693,872 | B1 | 6/2020 | Larson et al. |
| 10,703,204 | B2 | 7/2020 | Hassan et al. |
| 10,745,032 | B2 | 8/2020 | Scheggi |
| 10,762,183 | B1 | 9/2020 | Charan et al. |
| 11,227,060 | B1 | 1/2022 | John et al. |
| 11,312,299 | B1 | 4/2022 | Assam |
| 11,479,258 | B1 | 10/2022 | Sanchez |
| 11,637,511 | B2 | 4/2023 | Sanchez |
| 2002/0121831 | A1 | 9/2002 | Egawa et al. |
| 2004/0200235 | A1 | 10/2004 | Kretchmer |
| 2005/0054941 | A1 | 3/2005 | Ting et al. |
| 2005/0230596 | A1 | 10/2005 | Howell et al. |
| 2006/0250043 | A1 | 11/2006 | Chung |
| 2008/0068559 | A1 | 3/2008 | Howell et al. |
| 2008/0218684 | A1 | 9/2008 | Howell et al. |
| 2008/0275309 | A1 | 11/2008 | Stivoric et al. |
| 2011/0007035 | A1 | 1/2011 | Shai |
| 2012/0184367 | A1 | 7/2012 | Parrott et al. |
| 2013/0335213 | A1 | 12/2013 | Sherony et al. |
| 2014/0107493 | A1 | 4/2014 | Yuen et al. |
| 2014/0118704 | A1 | 5/2014 | Duelli et al. |
| 2014/0120983 | A1 | 5/2014 | Lam |
| 2014/0218529 | A1 | 8/2014 | Mahmoud et al. |
| 2014/0238153 | A1 | 8/2014 | Wood et al. |
| 2014/0240132 | A1 | 8/2014 | Bychkov |
| 2014/0309849 | A1 | 10/2014 | Ricci |
| 2015/0003693 | A1 | 1/2015 | Baca et al. |
| 2015/0019266 | A1 | 1/2015 | Stempora |
| 2015/0046996 | A1 | 2/2015 | Slaby et al. |
| 2015/0062086 | A1 | 3/2015 | Nattukallingal |
| 2015/0065090 | A1 | 3/2015 | Yeh |
| 2015/0124096 | A1 | 5/2015 | Koravadi |
| 2015/0126824 | A1 | 5/2015 | Leboeuf et al. |
| 2015/0158499 | A1 | 6/2015 | Koravadi |
| 2015/0220109 | A1 | 8/2015 | Von et al. |
| 2015/0277559 | A1 | 10/2015 | Vescovi et al. |
| 2015/0338926 | A1 | 11/2015 | Park et al. |
| 2015/0352953 | A1 | 12/2015 | Koravadi |
| 2016/0028267 | A1 | 1/2016 | Lee et al. |
| 2016/0098530 | A1 | 4/2016 | Dill et al. |
| 2016/0226313 | A1 | 8/2016 | Okubo |
| 2016/0236692 | A1 | 8/2016 | Kleen et al. |
| 2016/0292563 | A1* | 10/2016 | Park .................. G06F 3/016 |
| 2016/0317060 | A1 | 11/2016 | Connor |
| 2016/0334901 | A1 | 11/2016 | Rihn |
| 2016/0336758 | A1 | 11/2016 | Breedvelt-Schouten et al. |
| 2016/0361032 | A1 | 12/2016 | Carter et al. |
| 2017/0010677 | A1 | 1/2017 | Roh et al. |
| 2017/0012925 | A1 | 1/2017 | Tekin et al. |
| 2017/0024008 | A1* | 1/2017 | Kienzle ................ G06F 3/017 |
| 2017/0026790 | A1 | 1/2017 | Flitsch et al. |
| 2017/0042477 | A1 | 2/2017 | Haverinen et al. |
| 2017/0053461 | A1 | 2/2017 | Pal et al. |
| 2017/0057492 | A1 | 3/2017 | Edgington et al. |
| 2017/0070078 | A1 | 3/2017 | Hwang et al. |
| 2017/0075701 | A1 | 3/2017 | Ricci et al. |
| 2017/0080952 | A1 | 3/2017 | Gupta et al. |
| 2017/0090475 | A1 | 3/2017 | Choi et al. |
| 2017/0109512 | A1 | 4/2017 | Bower et al. |
| 2017/0129335 | A1 | 5/2017 | Lu et al. |
| 2017/0131772 | A1 | 5/2017 | Choi |
| 2017/0190121 | A1 | 7/2017 | Aggarwal et al. |
| 2017/0242428 | A1 | 8/2017 | Pal et al. |
| 2017/0346635 | A1 | 11/2017 | Gummeson et al. |
| 2017/0347895 | A1 | 12/2017 | Wei et al. |
| 2017/0374074 | A1 | 12/2017 | Stuntebeck |
| 2018/0025351 | A1 | 1/2018 | Chen et al. |
| 2018/0025430 | A1 | 1/2018 | Perl et al. |
| 2018/0032126 | A1* | 2/2018 | Liu .................... G06F 3/011 |
| 2018/0037228 | A1 | 2/2018 | Biondo et al. |
| 2018/0039303 | A1 | 2/2018 | Hashimoto et al. |
| 2018/0052428 | A1* | 2/2018 | Abramov ............ G06F 1/163 |
| 2018/0054513 | A1 | 2/2018 | Ma |
| 2018/0068105 | A1 | 3/2018 | Shapiro et al. |
| 2018/0093606 | A1 | 4/2018 | Terwilliger et al. |
| 2018/0093672 | A1 | 4/2018 | Terwilliger et al. |
| 2018/0115797 | A1 | 4/2018 | Wexler et al. |
| 2018/0120892 | A1 | 5/2018 | Von et al. |
| 2018/0123629 | A1 | 5/2018 | Wetzig |
| 2018/0167200 | A1 | 6/2018 | High et al. |
| 2018/0174457 | A1 | 6/2018 | Taylor |
| 2018/0178712 | A1 | 6/2018 | Terwilliger et al. |
| 2018/0292901 | A1* | 10/2018 | Priyantha ............ G06F 3/041 |
| 2018/0300467 | A1 | 10/2018 | Kwong et al. |
| 2018/0322957 | A1 | 11/2018 | Dill et al. |
| 2019/0049267 | A1 | 2/2019 | Huang |
| 2019/0083022 | A1 | 3/2019 | Huang |
| 2019/0131812 | A1* | 5/2019 | Lee .................... G06F 1/163 |
| 2019/0155104 | A1 | 5/2019 | Li et al. |
| 2019/0155385 | A1 | 5/2019 | Lim et al. |
| 2019/0191998 | A1 | 6/2019 | Heikenfeld et al. |
| 2019/0230507 | A1* | 7/2019 | Li ...................... H04W 12/06 |
| 2019/0265868 | A1 | 8/2019 | Penilla et al. |
| 2019/0286805 | A1 | 9/2019 | Law et al. |
| 2019/0287083 | A1 | 9/2019 | Wurmfeld et al. |
| 2019/0298173 | A1 | 10/2019 | Lawrence et al. |
| 2019/0332140 | A1 | 10/2019 | Wang et al. |
| 2019/0342329 | A1 | 11/2019 | Turgeman |
| 2019/0357834 | A1 | 11/2019 | Aarts et al. |

(56) References Cited

U.S. PATENT DOCUMENTS

| | | |
|---|---|---|
| 2020/0005791 A1 | 1/2020 | Rakshit et al. |
| 2020/0070840 A1 | 3/2020 | Gunaratne |
| 2020/0218238 A1 | 7/2020 | Wang |
| 2020/0356652 A1 | 11/2020 | Yamaguchi et al. |
| 2020/0391696 A1 | 12/2020 | Kato et al. |
| 2021/0019731 A1 | 1/2021 | Rule et al. |
| 2021/0029112 A1 | 1/2021 | Palle et al. |
| 2021/0197919 A1 | 7/2021 | Tsuji |
| 2021/0382684 A1 | 12/2021 | Hachiya et al. |
| 2022/0083149 A1 | 3/2022 | Keller et al. |
| 2022/0320899 A1* | 10/2022 | Sanchez ............... A44C 9/0053 |
| 2023/0027131 A1* | 1/2023 | Sanchez ............... H02J 7/0047 |

FOREIGN PATENT DOCUMENTS

| | | |
|---|---|---|
| CN | 106360895 A | 2/2017 |
| CN | 206213423 U | 6/2017 |
| CN | 206333477 U | 7/2017 |
| CN | 206371611 U | 8/2017 |
| CN | 107139933 A | 9/2017 |
| CN | 107260139 A | 10/2017 |
| CN | 108900691 A | 11/2018 |
| CN | 108926081 A | 12/2018 |
| DE | 102015006677 A1 | 11/2016 |
| DE | 102019116618 A1 | 12/2020 |
| EP | 2581856 A1 | 4/2013 |
| KR | 10-2017-0087113 A | 7/2017 |
| KR | 20170087113 * | 7/2017 |
| WO | 2015/077418 A1 | 5/2015 |
| WO | 2017/136940 A1 | 8/2017 |
| WO | 2018/000396 A1 | 1/2018 |
| WO | 2018/154341 A1 | 8/2018 |
| WO | 2018/204811 A1 | 11/2018 |
| WO | 2019/082095 A1 | 5/2019 |
| WO | 2019/140528 A1 | 7/2019 |
| WO | 2019/180626 A1 | 9/2019 |

OTHER PUBLICATIONS

"Vauxhall/Opel In-Car Wireless Charging", retrieved from <https://www.air-charge.com/aircharge-for-business/automotive/vauxhall-wireless-charging>, Oct. 2019, 4 pages.

"Wireless charging for smart ring/pointing devices" available online at <http://www.humavox.com/smt_product/wireless-charging-for-smart-ringpointing-devices/>, Oct. 2019, 3 pages.

ASU projection wearable: Live tomorrow today (world first launch @ CES 2016). (Dec. 2015). ASU Tech, YouTube. Retrieved from https://www.youtube.com/watch?v=Wdb5O-D7YOY.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printing/, Sep. 6, 2017, pp. 11.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61.

Charles Q. Choi, "Low Battery? New Tech Lets You Wirelessly Share Power", available online at <https://www.livescience.com/54790-new-tech-enables-wireless-charging.html>, May 19, 2016, 9 pages.

Chen, X. A., et al., "Encore: 3D printed augmentation of everyday objects with printed-over, affixed and interlocked attachments," Nov. 5, 2015, pp. 73-82.

Chen, X. A., et al., "Reprise: A design tool for specifying, generating, and customizing 3D printable adaptations on everyday objects," Oct. 16, 2016, pp. 29-39.

E-Senses, "Personal vitamin D, sunlight and daylight coach", available online at <https://e-senses.com/>, 2019, 5 pages.

Hipolite, W., "The 3D printed Ö Bluetooth Ring is one of the tiniest personal computers you will ever see," 3DPrint.com. Retrieved from https://3dprint.com/34627/o-bluetooth-ring-3d-printed/, Jan. 2015, pp. 5.

Hussain Almossawi, "This smart ring aims to provide better lives for people with sickle cell disease", retrieved from <https://www.core77.com/projects/82131/This-Smart-Ring-Aims-to-Provide-Better-Lives-for-People-with-Sickle-Cell-Disease>, 2021, 9 pages.

Je et al., "PokeRing: Notifications by poking around the finger", Proceedings of the 2018 CHI Conference on Human Factors in Computing Systems—CHI'18, 2018, paper 542, pp. 1-10.

Katharine Schwab, "Orii, the ring that turns your finger into a phone, is here", available online at < https://www.fastcompany.com/90399237/orii-the-ring-that-turns-your-finger-into-a-phone-is-here >, 2019, 4 pages.

Magno et al., "Self-sustainable smart ring for long-term monitoring of blood oxygenation", IEEE Access, 2019, pp. 115400-115408.

Mahmud et al., "Wearable technology for drug abuse detection: A survey of recent advancements", Smart Health, vol. 13, Aug. 2019, 100062.

Margaret, "The Orb: A Bluetooth headset that turns into a ring", Gadgets, BornRich, Jun. 2013, available online at <http://www.bornrich.com/the-orb-a-bluetooth-headset-that-turns-into-a-ring.html >.

Nassi et al., "Virtual breathalyzer", Department of Software and Information Systems Engineering, Ben-Gurion University of the Negev, Israel, 2016, 10 pages.

Neev Kiran, "SkinnySensor: Enabling Battery-Less Wearable Sensors via Intrabody Power Transfer", Masters Theses 694, University of Massachusetts Amherst, 2018, 63 pages.

Nerd-Fu, "Push present", Delicious Juice Dot Com, Apr. 2015, available online at < https://blog.deliciousjuice.com/2015/04/ >.

Pablo E Suárez, "NXT Ring—Your Digital-self at Hand", available online at <https://www.youtube.com/watch?v=9w7uxDHs7NY>, uploaded on Jun. 21, 2019, 2 pages.

Roumen et al., "NotiRing: A comparative study of notification channels for wearable interactive rings", Proceedings of the 33rd Annual ACM Conference on Human Factors in Computing Systems—CHI'15, 2015, pp. 2497-2500.

Sarah Jacobsson Purewal, "Ringly review: The smart ring that could be sexier", available online at <https://www.macworld.com/article/227133/ringly-review-the-smart-ring-that-could-be-sexier.html>, 2016, 10 pages.

Schwab, K., "This startup wants to kill passwords—and replace them with jewelry. Fast Company," Retrieved from https://www.fastcompany.com/90254843/this-startup-wants-to-kill-passwords-and-replace-them-with-jewelry, (Oct. 2018), pp. 7.

Seung et al., "Nanopatterned Textile-Based Wearable Triboelectric Nanogenerator", ACS Nano, vol. 9, 2015, pp. 3501-3509.

Shane McGlaun, "Geek builds Bluetooth Smart Ring with OLED display", available online at <https://www.slashgear.com/geek-builds-bluetooth-smart-ring-with-oled-display-02361383/>, 2015, 6 pages.

Sperlazza, "We tested four sleep tracker apps and wearables: Here are the best ones", available online at <https://www.bulletproof.com/sleep/tech/best-sleep-tracker-apps/>, 2019, 18 pages.

Turunen, "Smart ring for stress control and self-understanding", available online at <https://slowfinland.fi/en/smart-ring-for-stress-control-and-self-understanding/>, 2017, 9 pages.

Wochit Tech. (2017). New smart ring monitors UV exposure [Video file]. Retrieved from https://www.youtube.com/watch?v=4YvkioTZxjU, 3 pages.

Worgan et al., "Garment level power distribution for wearables using inductive power transfer", 9th International Conference on Human System Interactions (HSI), 2016, pp. 277-283.

Xiao et al., "LumiWatch: On-arm projected graphics and touch input", Proceedings of the 2018 CHI Conference on Human Factors in Computing Systems—CHI'18, 2018, pp. 1-11.

Zhu et al., "Developing a driving fatigue detection system using physiological sensors", Proceedings of the 29th Australian Conference on Computer-Human Interaction—OZCHI '17, 2017, pp. 566-570.

Zhu, M. et al. "Fluidic fabric muscle sheets for wearable and soft robotics," Retrieved from https://arxiv.org/pdf/1903.08253.pdf, Mar. 2019, pp. 32.

https://en.wikipedia.org/w/index.php?title=Ring_size&oldid=891328817 (Year: 2019).

(56) References Cited

OTHER PUBLICATIONS

Mario, https://www.smartringnews.com/posts/smart-ring-vs-smartwatch-which-is-the-best-fitness-and-activity-tracker (Year: 2014).
Adafruit, p. 1-2, available at: https://www.adafruit.com/product/2806, published Jun. 2019 (Year: 2019).
Laput et al., "Skin buttons: cheap, small, low-powered and clickable fixed-icon laser projectors", UIST '14: Proceedings of the 27th annual ACM symposium on User interface software and technology, Oct. 2014 pp. 389-394.
Adafruit.com, "RFID/NFC Smart Ring—Size 12—NTAG213", Accessed at: https://web.archive.org/web/20190605061438/https://www.adafruit.com/product/2806, publication Jun. 5, 2019 (Year: 2019).
Google translation of KR20170087113A (Year: 2016).

\* cited by examiner

SMART RING POWER AND CHARGING

CROSS-REFERENCES TO RELATED APPLICATIONS

This application claims priority to U.S. Provisional Patent Application No. 62/877,391, filed Jul. 23, 2019, and U.S. Provisional Patent Application No. 62/992,328, filed Mar. 20, 2020, both incorporated by reference herein for all purposes.

FIELD OF THE DISCLOSURE

The present disclosure generally relates to smart ring wearable devices and, more specifically, to smart ring devices with removable power sources in the environment for enabling charging when a user holds an object with an integrated charger while wearing the smart ring.

BACKGROUND

To the extent that smart ring technology has been adopted, it has a number of challenges. For example, a number of problems exist with wearable devices generally, including: they often need to be removed for charging; they often have poor fit; they often provide relatively little user interactivity; and they often provide limited functionality.

BRIEF SUMMARY

A smart ring may be configured with a removable power source and an internal power source. The internal power source may enable continued operation of the smart ring disposed at a finger of a user, while the removable power source may be detached from the smart ring for charging or to be replaced with another charged removable power source. The removable power source may be disposed as a platform at an outer surface of a band-shaped housing of the smart ring. When attached to the smart ring, the removable power source may charge the internal power source. Attaching the removable power source to the band-shaped housing with an adapter may add flexibility to configuring smart rings. Furthermore, the smart ring may operate in a variety of power modes depending on whether the removable power source is attached to the band-shaped housing. In some implementations, the band-shaped housing or the removable power source may include an energy-harvesting component configured to charge, respectively, the internal power source or the removable power source from ambient energy sources.

In one aspect, a smart ring comprises a band-shaped housing and a removable power source, the removable power source configured to be removably disposed as a platform at an outer surface of the band-shaped housing and to charge the internal power source. The band-shaped housing includes an internal power source and a component configured to draw energy from the internal power source. The component is further configured to perform any one or more of the following operations: i) sense a physical phenomenon external to the band-shaped housing, ii) send communication signals to a communication device external to the band-shaped housing, or iii) implement a user interface.

In another aspect, a method of operating a smart ring comprises attaching, to a band-shaped housing of the smart ring, a removable power source to be removably disposed as a platform at an outer surface of the band-shaped housing. The method further comprises transferring electrical energy from the removable power source to an internal power source disposed within the band-shaped housing. Still further, the method comprises drawing electrical energy from the internal power source by a component disposed within the band-shaped housing and performing, by the component drawing energy from the internal power source, any one or more of the following operations: i) sensing a physical phenomenon external to the band-shaped housing, ii) sending communication signals to a communication device external to the band-shaped housing, or iii) implementing a user interface.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
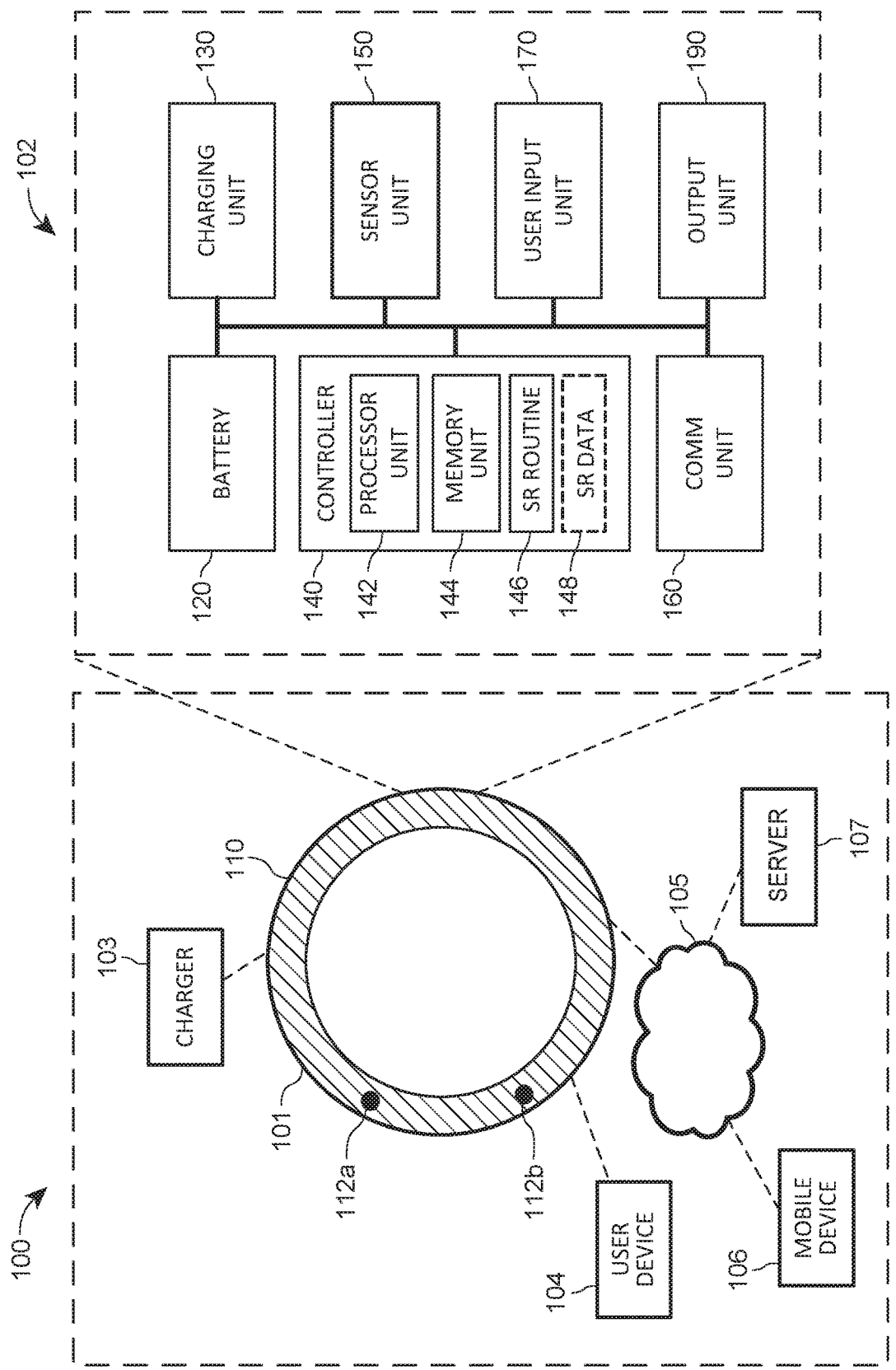
FIG. 1 illustrates a system comprising a smart ring and a block diagram of smart ring components according to some embodiments.

Smart ring wearable technology can enable a wide range of applications including security, safety, health and wellness, and convenient interfacing between a user and a variety of technologies based at least in part upon integrating a variety of sensor, input/output devices, and computing capabilities in a compact form factor. One of the challenges in increasing smart ring capabilities is reliably powering the needed components, particularly considering the limited space for a power source in the compact form factor. An ability to conveniently charge a power source of a smart ring without removing the smart ring from a finger would contribute to the adoption of smart ring technology.

One way to charge a smart ring without removing the smart ring from the finger may include using a removable power source. The removable power source may be disposed at an outer surface of the band-shaped housing of the smart ring, much as a jewel or another decorative element may be disposed at a band of a ring. We may refer to this as a band and platform configuration. The platform configuration may have some advantages in comparison to attaching a removable power source that has an annular shape in a side-by-side configuration with the band-shaped housing. For example, the band and platform configurations allow a variety of form factors and capacities in the removable power source. Furthermore, the power source need not be sized to the finger of the user. Also, an outer surface of the platform may integrate additional functionality, such as a display or an energy harvesting photovoltaic element.

Connecting a removable power source to the band-shaped housing via an adapter may confer additional advantages to smart ring configurations with removable power sources. Adapters may be configured to interface a plurality of power source options with a plurality of housing options in a variety of geometries, as described below.

When attached to the smart ring, the removable power source may charge an internal power source of the smart ring. The internal power source may maintain the state (e.g., by preserving the state of volatile memory) or maintain some other functions of the smart ring (e.g., sensing), while the removable power source is being replaced. In some implementations, adding the removable power source may enable or trigger higher power functionality of the smart ring (e.g., wireless communications, displays, etc.). To that end, a sensor may be configured for detecting whether the removable power source is attached to the band-shaped housing.

Various techniques, systems, and methods for charging a power source of a smart ring using charging sources integrated into objects in the environment of the smart ring are discussed below with reference to FIG. 1, FIG. 2, FIG. 3, FIG. 4, FIG. 5A, FIG. 5B, FIG. 5C, and FIG. 5D. In section I, a smart ring that may include a removable power source is described with reference to FIG. 1. In section II, example smart ring form factor types and configurations that may accommodate a removable power source are discussed with reference to FIG. 2 and FIG. 3. In section III, an example operating environment in which a smart ring with the removable power source may operate is described with reference to FIG. 4. In section IV, example configurations of assembled smart rings with removable power sources as well as the constituent components are described with reference to FIG. 5A, FIG. 5B, FIG. 5C, and FIG. 5D. In section V, other considerations are described.

Examples of Smart Ring and Smart Ring Components

FIG. 1 illustrates a system 100 comprising a smart ring 101 that may include a removable power source attached to a band-shaped housing according to one or more of the techniques described herein. FIG. 1 also shows one or more devices or systems that may be electrically, mechanically, or communicatively connected to the smart ring 101. As shown, the smart ring 101 may include a set of components 102, which may have various power needs and may impact the rate at which the smart ring 101 consumes electrical energy. Some of the components 102 may be disposed at the band-shaped housing, as described below, and interact with the components disposed at the removable charging source of the smart ring 101 or outside of the smart ring 101 altogether. Furthermore, in implementations where the smart ring 101 uses wireless transfer of electromagnetic energy between the removable power source and the internal power source of the smart ring, the components 102 may be configured to be compatible with the electromagnetic fields to which the components 102 may be exposed during the wireless power transfer.

The system 100 may comprise any one or more of: a charger 103 for the smart ring 101, a user device 104, a network 105, a mobile device 106, or a server 107. The charger 103 may provide energy to the smart ring 101 via a direct electrical, a wireless, or an optical connection. The smart ring 101 may be in a direct communicative connection with the user device 104, the mobile device 106, or the server 107 via the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g.; via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 140, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 140, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (µP), a digital signal processor (DSP), a central processing unit (CPU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), or any other suitable type of sensor. The sensor unit 150 may include, for example, an inertial motion unit (IMU) for detecting orientation and movement of the ring 101.

The communication unit 60 may facilitate wired or wireless communication between the ring 101 and one or more other devices. The communication unit 160 may include, for example, a network adapter to connect to a computer network, and, via the network, to network-connected devices. The computer network may be the Internet or another type of suitable network (e.g., a personal area network (PAN), a local area network (LAN), a metropolitan area network (MAN); a wide area network (WAN), a mobile, a wired or wireless network, a private network, a virtual private network, etc.). The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiberoptic, twisted-pair, coaxial cable).

User input unit 170 may collect information from a person wearing the ring 101 or another user, capable of interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical) devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

Example Smart Ring Form Factor Types

Figure 2:
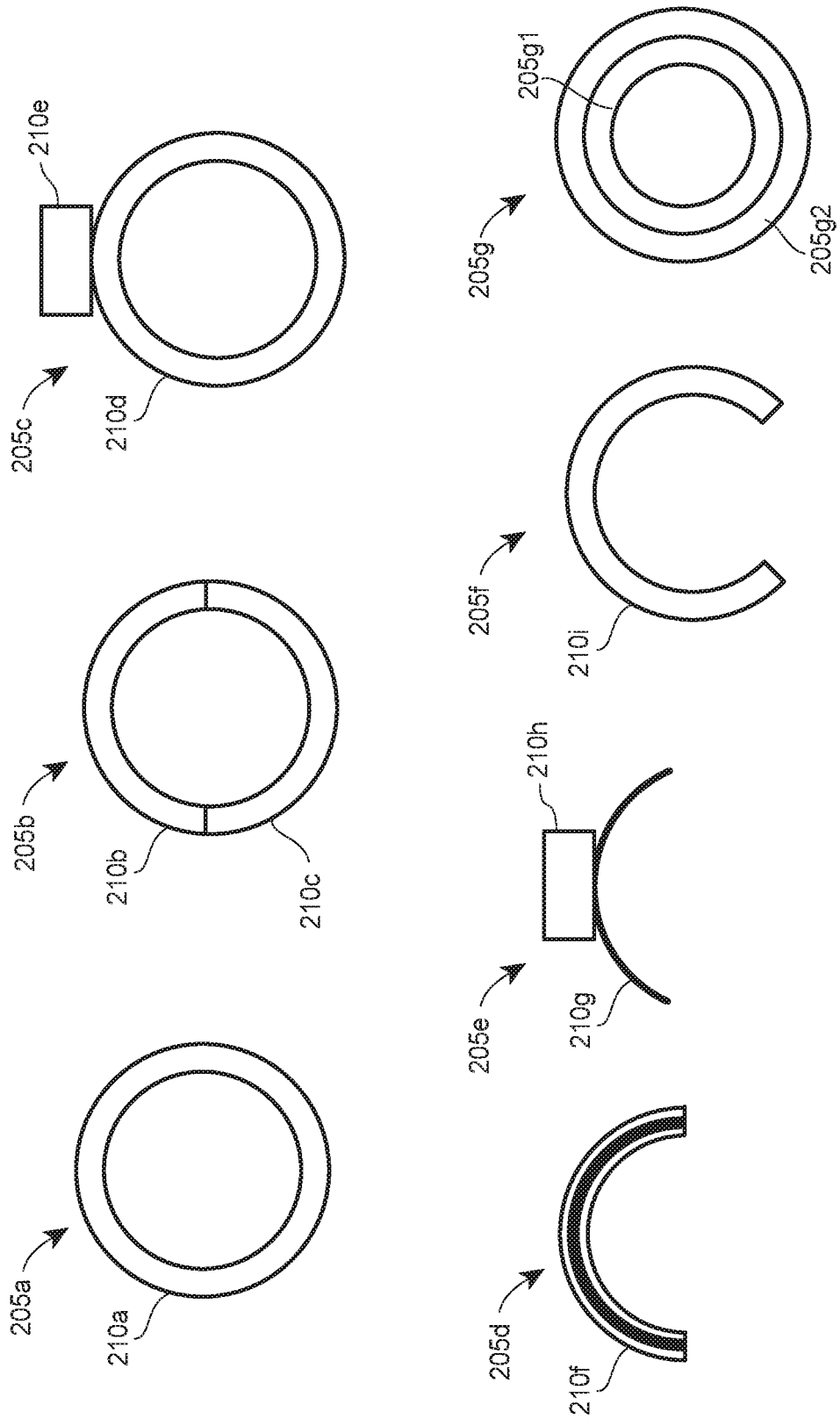
FIG. 2 illustrates a number of different form factor types of a smart ring according to some embodiments.

FIG. 2 includes block diagrams of a number of different example form factor types or configurations 205a, 205b, 205c, 205d, 205e, and/or 205f of a smart ring (e.g., the smart ring 101). The variety of configurations of the ring-shaped housing may influence, or, conversely, depend on the technique for attaching a removable power source. Furthermore, the configurations 205a, 205b, 205c, 205d, 205e, and/or 205f may depend on or determine the types of indicators or communication components disposed at the ring.

The configurations 205a, 205b, 205c, 205d, 205e, and/or 205f (which may also be referred to as the smart rings 205a, 205b, 205c, 205d, 205e, and/or 205f) may each represent an implementation of the smart ring 101, and each may include any one or more of the components 102 (or components similar to the components 102). In some embodiments, one or more of the components 102 may not be included in the configurations 205a, 205b, 205c, 205d, 205e, and/or 205f. The configurations 205a, 205b, 205c, 205d, 205e, and/or 205f include housings 210a-f, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c. The two housing parts 210b and 210c may each house at least some of the components 102, distributed between the housing parks 210b and 210c in any suitable manner.

The configuration 205c may be referred to as a band-and-platform configuration comprising (i) a housing component 210d and (ii) a housing component 210e (sometimes called the "platform 210e"), which may be in a fixed or removable mechanical connection with the housing 210d. The platform 210e may function as a mount for a "jewel" or for any other suitable attachment. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a housing 210f with a groove to enable clipping onto a conventional ring. The grooved clip-on housing 210f may house the smart ring components described above. The configuration 205e may clip onto a conventional ring using a substantially flat clip 210g part of the housing and contain the smart ring components in a platform 210h part of the housing.

The configuration 205f, on the other hand, may be configured to be capable of being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes than a fully annular band (360 degrees), and may be elastic. A restorative force produced by a deformation of the housing 210i may ensure a suitable physical contact with the finger. Additional suitable combinations of configurations (not illustrated) may combine at least some of the housing features discussed above.

The configuration 205g may be configured to have two rings, a first ring 205g1 capable of and adapted to be mounted onto a finger of a user, and a second ring 205g2 capable of and adapted to be directly mounted onto the first ring 205g1, as depicted in FIG. 2. Said another way, the first ring 205g1 and the second ring 205g2 are arranged in a concentric circle arrangement, such that the second ring 205g2 does not contact a user's finger when the smart ring 205g is worn. Rather, only the first ring 205g1 contacts the user's finger. Additional suitable combinations of configurations (not illustrated) may combine at least some of the housing features discussed above.

Figure 3:
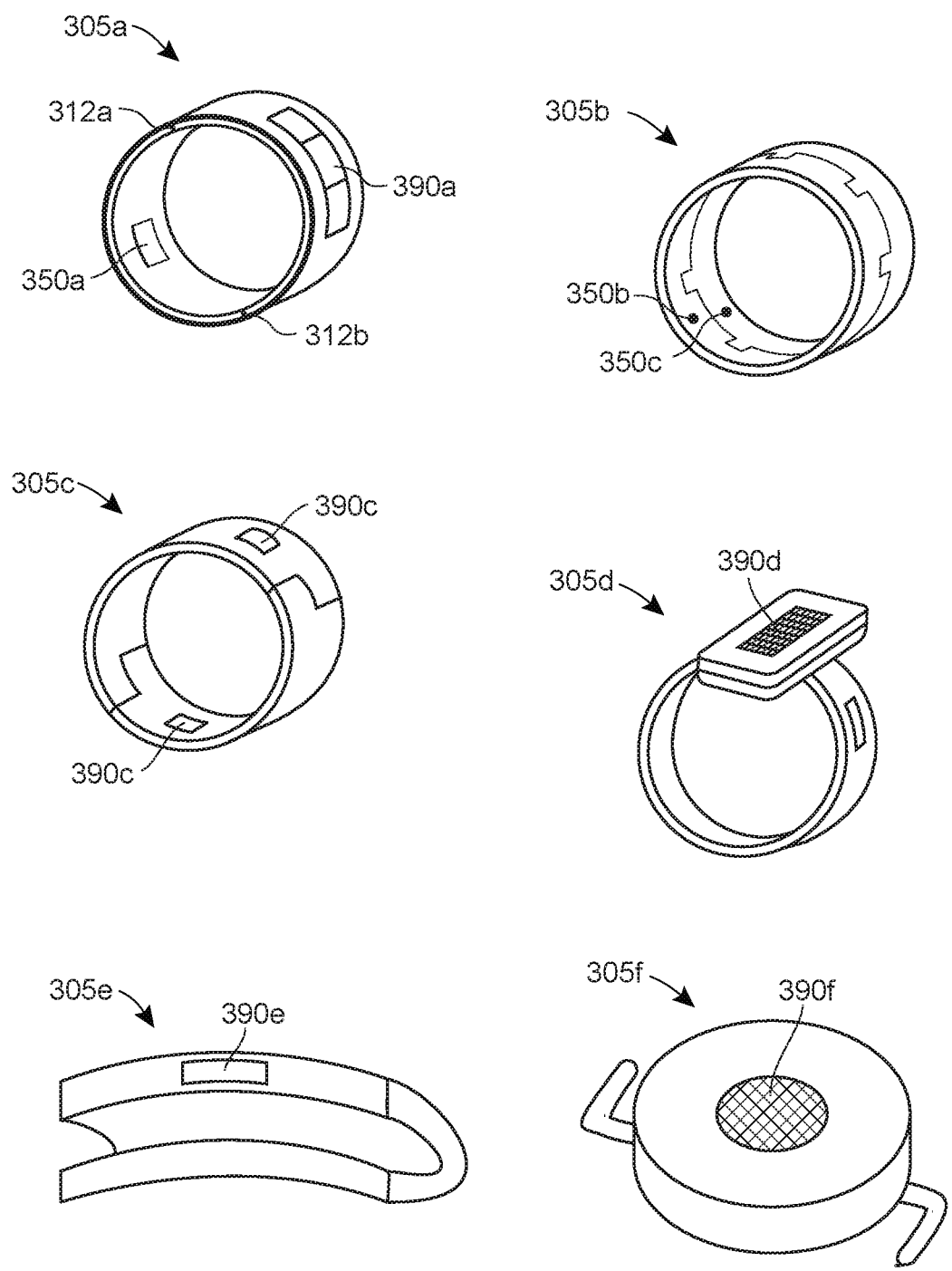
FIG. 3 illustrates examples of different smart ring form factors.

FIG. 3 includes perspective views of example configurations 305a, 305b, 305c, 305d, 305e, and/or 305f of a smart ring (e.g., the smart ring 101) in which a number of surface elements are included.

Configuration 305a is an example band configuration 205a of a smart ring (e.g., smart ring 101). Some of the surface elements of the housing may include interfaces 312a, 312b that may be electrically connected to, for example, the charging unit 130 or the communications unit 160. On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

The configurations 305b and 305c are examples of configurations of a smart ring with multiple housing parts (e.g., configuration 205b in FIG. 2). Two (or more) parts may be separate axially (configuration 305b), azimuthally (configuration 305c), or radially (nested rings, not shown). The parts may be connected mechanically, electrically, or optically via, for example, interfaces analogous to interfaces 312a, 312b in configuration 305a. Each part of a smart ring housing may have one or more surface elements, such as, for example, sensors 350b, 350c or output elements 390b, 390c. The latter may be LEDs (e.g., output element 390b) or haptic feedback devices (e.g., output element 390c), among other suitable sensor or output devices. Additionally or alternatively, at least some of the surface elements (e.g., microphones, touch sensors) may belong to the user input unit 170.

Configuration 305d may be an example of a band and platform configuration (e.g., configuration 205c), while configurations 305e and 305f may be examples of the partial ring configurations 205d and 205e, respectively. Output devices 390d, 390e, and/or 390f on the corresponding configurations 305d, 305e, and/or 305f may be LCD display, OLED displays, e-ink displays, one or more LED pixels, speakers, or any other suitable output devices that may be a part of a suite of outputs represented by an output unit (e.g., output unit 190). Other surface elements, such as an interface component 312c may be disposed within, at, or through the housing. It should be appreciated that a variety of suitable surface elements may be disposed at the illustrated configurations 305a, 305b, 305c, 305d, 305e, and/or 305f at largely interchangeable locations. For example, the output elements 390d, 390e, and/or 390f may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

Example Operating Environment for a Smart Ring

Figure 4:
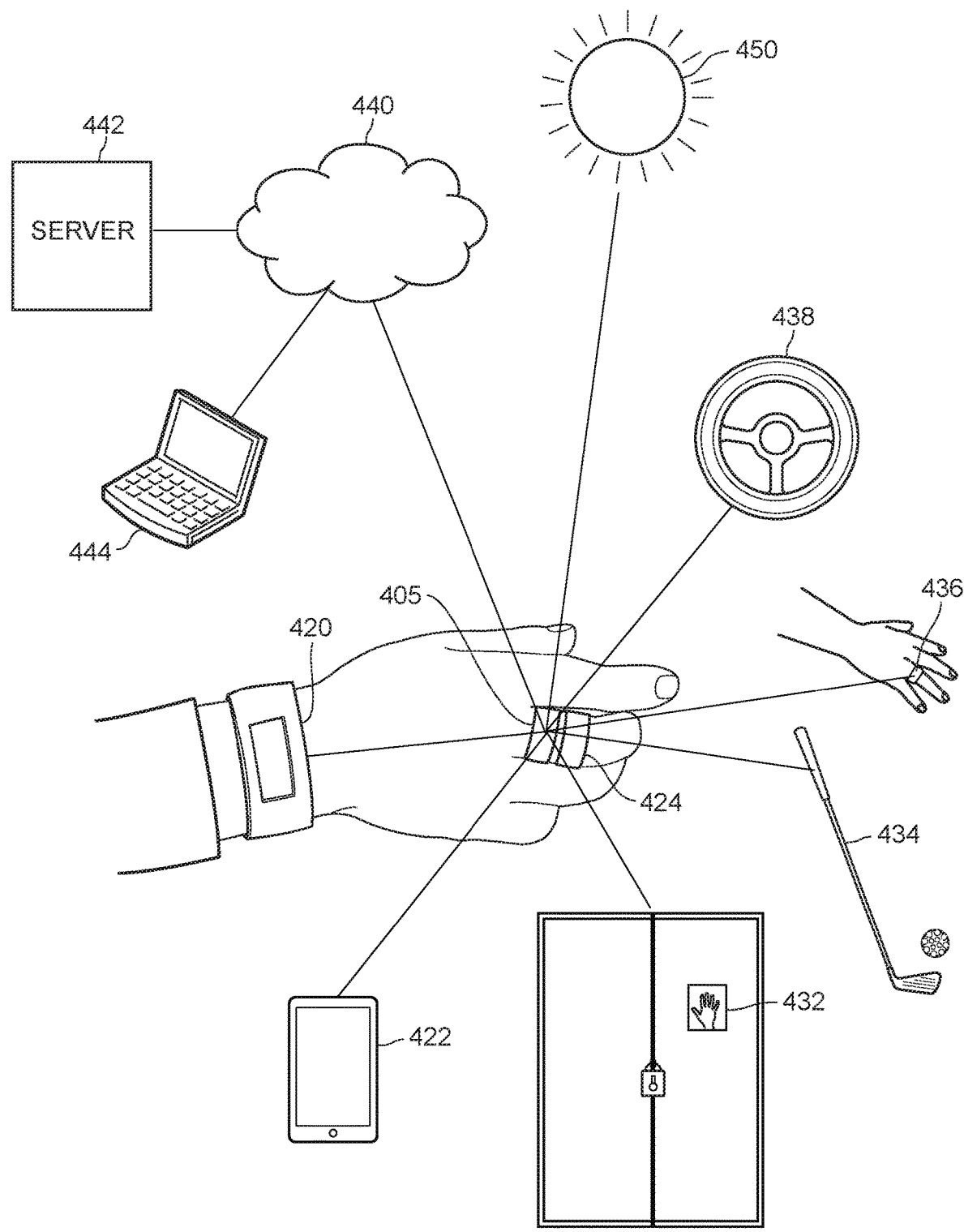
FIG. 4 illustrates an environment within which a smart ring may operate according to some embodiments.

FIG. 4 illustrates an example environment 400 within which a smart ring 405 with a removable power source may be configured to operate. In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205a, 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and via the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a, 210b, 210c, 210d, 210e, 210f, 210g, 210h, and/or 210i) of the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

Configurations of Smart Rings with Removable Power Sources

Adding a removable external power source to a smart ring may confer a number of advantages in comparison to a smart ring with only a build-in power source. A rechargeable removable power source may be removed from the smart ring for charging, while the smart ring maintains a level of operation while remaining on a finger of a user. To maintain operation, the smart ring may include a small built-in power source. The energy storage and power capacity of the built-in power source may vary depending on implementation. In some implementations, when the removable power source is removed, it may be replaced by another fully charged removable power source in a few seconds, for example. A removable power source may be larger than an internal power source that can be placed within a band-shaped housing of the smart ring, and, consequently may store significantly more charge than an internal power source. Thus, the larger external power source may enable more applications for the smart ring. Still furthermore, the removable external power sources may be available in a variety of form factors that may be exchanged by a user according to their preference between bulk and capacity. Generally, removable power sources may enable flexible use of the smart ring while offering multiple aesthetic and comfort choices.

To connect to a housing of the smart ring, a removable power source may connect to an adapter. For the purpose of discussion here, the adapter may be any component that facilitates a removable attachment between the housing and the removable power source. The adapter may be configured to include other functionality, such as facilitating electrical or communicative connections, for example. Generally, the adapter may be fixedly attached to the housing or to the removable power source. A combination of adapters may be distributed between the housing and the power source. On the other hand, the adapter may be a distinct component, configured to removably attach to the housing and the removable power source.

The adapter that is removable from the band-shaped housing and from the removable power source may have a number of advantages. For example, removable adapters may be configured to attach a smart ring housing to one of a selection of removable power sources. Conversely, removable adapters may be configured to attach a removable power source to one of a selection of housings. Furthermore, design elements may be included in an adapter, offering aesthetic choices to a user. Still furthermore, repetitive removal of the removable power source may impose a certain amount of wear on the adapter. It may be advantageous to periodically replace the adapter without replacing either the smart ring or the removable power source.

FIG. 5A, FIG. 5B, FIG. 5C, and FIG. 5D illustrate assembled configurations 505a, 505b, and/or 505c (in FIG. 5B and FIG. 5D) and corresponding constituent components (in FIG. 5A and FIG. 5C) of smart rings that include a band-shaped housing 510 and removable external power sources 520a, 520b, and/or 520c (that may also be referred to, for conciseness, as external power sources or removable power sources). The band-shaped housing 510 may have an outer surface 512, an inner surface 513, and two side surfaces 514. Though the surfaces 512, 514 may blend into one another, the outer surface 512 may refer to a portion of the housing surface that is substantially opposite to another portion of the housing surface that is configured to be in contact with a finger of a user. In the configurations 505a, 505b, and/or 505c, the removable power sources 520a, 520b, and/or 520c are configured to be disposed at the outer surface 512 of the band-shaped housing 510 with the aid of adapters 580a, 580b, and/or 580c, as described below.

The band-shaped housing 510 may be the, for example, the housing 110 of the ring 101 in FIG. 1. The housing 510 may include any of the components 102 that enable smart ring functionality as described above. Furthermore, the band-shaped housing 510 may be configured similarly to configurations 205a, 205b, 205c, 205d, 205e, 205f, and/or 205g in FIG. 2. In so far as the configurations 205d, 205e, and/or 205f do not for a complete band, the band-shaped housing 510 may be formed by a combination of a ring with any of the partial-ring configurations 205d, 205e, and/or 205f. In so far as the configurations 205c and 205e already include housing components 210e and 210h disposed as platforms at band-shaped housing components, the removable power sources 520a, 520b, and/or 520c may be disposed at the band-shaped housing 510 instead of or in addition to the housing components 210e and 210h.

The housing 510 includes an internal power source. The internal power source may be a battery (e.g., the battery 120), a capacitor, or a suitable combination of the two. In some implementations, the internal power source may include a generator, configured, for example, to harvest energy from environmental energy sources (e.g., light, movement, temperature gradients). The internal power source may be configured for recharging from the external power sources 520a, 520b, and/or 520c, or from an array of other charging sources or chargers. Some chargers may be wall-plug chargers, some chargers may be environmentally integrated chargers (e.g., built into the steering wheel 438, the golf club 434 of the environment 400) or wearable chargers (e.g., the bracelet 420, a charging glove, etc.). To recharge the internal power source, a charging unit (e.g., the charging unit 130) may be disposed within the housing 510. The charging unit may enable wired charging of the internal power source via an electrical connection. Additionally or alternatively, the charging unit may enable wireless charging. The charging unit configured for wireless charging may include an induction coil connected to rectification components to enable charging by electromagnetic induction. The charging unit disposed within the band-shaped housing 510 may facilitate charging the internal power source from the external power source 520a, 520b, and/or 520c.

Another component disposed within the band-shaped housing 510 may be configured to enable smart-ring functionality (e.g., as described in the discussion of FIG. 1) while drawing power (equivalently: charge, current, or energy) from the internal power source. For example, the component may be a sensor configured to sense a physical phenomenon external to the band-shaped housing 510, an electronic communication interface disposed within the band-shaped housing 510 or a user interface disposed in, at, or throughout the band-shaped housing 510. Furthermore, a controller (e.g., the controller 140) may be disposed within the band-shaped housing and configured to draw power from the internal power source. In some implementations, any of the components disposed within the band-shaped housing 510 that need power may be configured to draw power from one of the external removable power sources 520a, 520b, and/or 520c that is disposed at the housing 510.

One of the components disposed within the band-shaped housing 510 may be a power detection sensor configured to detect a presence of a removable power source (e.g., one of 520a, 520b, and/or 520c). The power detection sensor may be included in the sensors 150 of the smart ring 101, for example. The power detection sensor may be a current sensor, a voltage sensor, a capacitance sensor, a magnetic sensor, an optical sensor or any other suitable sensor. The smart ring may be configured to operate in one of a plurality of power modes and switch between power modes based at least in part upon detecting the presence (or lack thereof) of the removable power source.

The band-shaped housing 510 may include an electrical interface 516, configured to cooperate with any one of the adapters 580a, 580b, and/or 580c in forming an electrical connection with corresponding one or more of the removable power sources 520a, 520b, and/or 520c. Thus formed electrical connections are discussed in more detail below.

The removable power sources 520a, 520b, and/or 520c may be configured to removably attach to the band-shaped housing 510 (e.g., via the adapters 580a, 580b, and/or 580c) to provide power or energy to the components disposed within or at the band-shaped housing 510. In some implementations, the removable power sources 520a, 520b, and/or 520c may provide energy only via recharging the internal power source disposed within the band-shaped housing 510. In other implementations, the removable power sources 520a, 520b, and/or 520c may provide the energy directly to at least some of the components (in addition to the internal power source) disposed within the housing 510. In either case, the external power sources may provide, on one charge, substantially more energy to the components disposed within the band-shaped housing 510 than what is available in a fully-charged internal power source. For example, a removable power source (e.g., one of the removable power sources 520a, 520b, and/or 520c) may have a capacity to store 10, 100, 1000, 10000 times or more energy than the internal power source.

Any of the removable power sources 520a, 520b, and/or 520c may include one or more cells that convert chemical, thermal, nuclear or another suitable form of energy into electrical energy. The cells in the power sources 520a, 520b, and/or 520c may include one or more alkaline, nickel-cadmium, nickel-metal-hydride, lithium, lithium-ion, lithium polymer or other suitable cells. The removable power sources 520a, 520b, and/or 520c may each include two terminals that, in operation, maintain a substantially fixed voltage of 1.5, 3, 4.5, 6, 9, 12 V or any other suitable terminal voltage between them. When fully charged, the removable power sources 520*a*, 520*b*, and/or 520*c* may each be capable of delivering an amount of charge, referred to herein as "full charge," without recharging. The full charge of one of the removable power sources 520*a*, 520*b*, and/or 520*c* may be 10, 20, 50, 100, 200, 500, 1000, 2000, 5000 mAh or any other suitable charge.

Any one of the removable power sources 520*a*, 520*b*, and/or 520*c* may be configured to transfer energy wirelessly to the internal power source of within the band-shaped housing 510 by way, for example, of the charging unit 130. To that end any one of the removable power sources 520*a*, 520*b*, and/or 520*c* may include a power transmitter. For example, the power transmitter may include a radio-frequency oscillator connected to a transmitting induction coil for transferring energy to a receiving induction coil disposed within the band-shaped housing 510. In other implementations, the power transmitter may include a laser diode for transferring energy to a photovoltaic element disposed within the band-shaped housing 510.

In some implementations, any one of the removable power sources 520*a*, 520*b*, and/or 520*c* may include a housing configured to hold one or more battery cells. The housing may include conductive elements to facilitate an electrical connection between the battery cells and the internal power source, e.g. via one of the adapters 580*a*, 580*b*, and/or 580*c*. The removable power sources 520*a*, 520*b*, and/or 520*c* may additionally include (e.g., disposed at a housing) elements for harvesting energy from the environment (e.g., photovoltaic cells, thermoelectric generators, piezoelectric generators, etc.). The harvesting elements may recharge the battery cells within the housing. The housing may additionally include elements for harvesting energy from the environment (e.g., photovoltaic cells, thermoelectric generators, piezoelectric generators, etc.) to recharge the battery cells within the housing. Additionally or alternatively, the housing may include elements for a wireless energy transfer (wireless charging) to the internal power source. Furthermore, the housing of any one of the removable power sources 520*a*, 520*b*, and/or 520*c* may include fixed or reconfigurable aesthetic elements.

Generally, external power sources 520*a*, 520*b*, and/or 520*c* may include additional functionality beyond providing energy to the internal power source or other components disposed within the band-shaped housing 510. One or more sensors, user interface components, memory storage devices, etc., may be disposed within the housing of any of the removable power sources 520*a*, 520*b*, and/or 520*c*. The housing may also include a communication interface (wired or wireless) between the components disposed within the removable power source housing and the components disposed within the band-shaped housing 510. In some implementations, the communication interface may be configured via a corresponding one of the adapters 580*a*, 580*b*, and/or 580*c*.

The adapters 580*a*, 580*b*, and/or 580*c* may include mechanical interfaces 582*a*, 582*b*, and/or 582*c* to the housing 510, mechanical interfaces 584*a*, 584*b*, and/or 584*c* to removable power sources 520*a*, 520*b*, and/or 520*c*, and electrical interfaces 586*a*, 586*b*, and/or 586*c* to facilitate electrical connections between the removable power sources 520*a*, 520*b*, and/or 520*c* and an internal power source disposed within the band-shaped housing 510. In some implementations, the housing mechanical interfaces 582*a*, 582*b*, and/or 582*c* and the power source mechanical interfaces 584*a*, 584*b*, and/or 584*c* may be made from the same material (e.g., metal, plastic, elastomer, etc.). For example, the adapters 580*a*, 580*b*, and/or 580*c* may be manufactured as substantially monolithic components including the mechanical interfaces 582*a*, 582*b*, and/or 582*c*, 584*a*, 584*b*, and/or 584*c*, with the electrical interfaces 586*a*, 586*b*, and/or 586*c* added in a separate manufacturing step. In other implementations, the housing interface material may be different from the power source interface material.

The housing mechanical interfaces 582*a*, 582*b*, and/or 582*c* may be configured for a friction fit with the housing 510. In other implementations, the housing mechanical interfaces 582*a*, 582*b*, and/or 582*c* may include a clipping mechanism, a set screw, a magnet, or any other suitable method for removably attaching to the housing 510. Still in other implementations, the adapters 580*a*, 580*b*, and/or 580*c* may be fixedly attached to the housing 510 via an adhesive or a solder, for example. To facilitate attachment to the housing 510, the housing mechanical interfaces 582*a*, 582*b*, and/or 582*c* may include surfaces shaped to conform to the outer surface 512 or side surfaces 514 of the housing 510.

The power source mechanical interfaces 584*a*, and 584*b* may be configured for a friction fit with the external power source 520*a* and 520*b* or may comprise a clipping mechanism. Additional mechanical features may facilitate connections. For example, the external power source 520*b* may include a groove 521 to mate with the interface 584*a* or the interface 584*b*. In another example, the external power source 520*c* may include a groove or a thread 521*c* that may be threaded onto a corresponding thread 585 in the interface 584*c*. Additionally or alternatively, the power source interfaces 584*a*, 584*b*, and/or 584*c* may include magnets, springs, or other suitable mechanisms to facilitate secure attachment and convenient removal of the removable power sources 520*a*, 520*b*, and/or 520*c* to the adapters 580*a*, 580*b*, and/or 580*c*.

The electrical interfaces 586*a*, 586*b*, and/or 586*c* of the adapters 580*a*, 580*b*, and/or 580*c* may include coaxial or two-pin male-male, female-male, or female-female adapters. The interfaces 586*a*, 586*b*, and/or 586*c* may provide two-contact connections between plugs or sockets disposed at the removable power sources 520*a*, 520*b*, and/or 520*c* and a corresponding plug or socket disposed at the interface 516 of the band-shaped housing 510. In some implementations, mechanical interfaces 582*a*, 582*b*, and/or 582*c* and 584*a*, 584*b*, and/or 584*c* may provide, at least partially, electrical connections between corresponding removable power sources 580*a*, 580*b*, and/or 580*c* and, for example, a charging unit disposed within the band-shaped housing 510. Such electrical connections may include one or more conductive paths via one or more of the surfaces 512, 514 of the band-shaped housing 510. For example, the housing 510 may serve as a ground connection for the electronics disposed within. The electrical interface 516 may then include a single contact, isolated from the ground connection and configured to connect via one of the electrical interfaces 586*a*, 586*b*, and/or 586*c* of the corresponding adapter 580*a*, 580*b*, and/or 580*c* to a corresponding contact at one of the removable power sources 520*a*, 520*b*, and/or 520*c*.

To add to the discussion on interfaces (e.g., 582*a*. 582*b*, and/or 582*c*, 584*a*, 584*b*, and/or 584*c*, 586*a*, 586*b*, and/or 586*c*), a mechanical interface (e.g., 582*a*, 582*b*, and/or 582*c*) with the band-shaped housing 510 may be different from a mechanical interface (e.g., 584*a*, 584*b*, and/or 584*c*) with a removable power source (e.g., 520*a*, 520*b*, and/or 520*c*). The mechanical interfaces may include snap interfaces and friction fit interfaces with a variety of materials, magnetically-facilitated attachments, threads, set screws, or spring-loaded connectors. As an example of the latter, pogo-pins may be included at an adapter (e.g., 580*a*, 580*b*, and/or 580*c*). The pogo pins may get depressed when pushed against the band-shaped housing 510 until reaching indentations at which the pogo pins may engage with an interface at the band-shaped housing 510. In this manner, the pogo pins made of a conductive material may facilitate both, mechanical and electrical connections. Additionally or alternatively, elastomeric connectors, made with alternately conductive and electrically insulating elastomer regions, may likewise facilitate both, mechanical and electrical connections. Pogo pins, elastomeric connectors, or other suitable interfaces may likewise be used to connect; mechanically and electrically, with a removable power source (e.g., 520*a*, 520*b*, and/or 520*c*).

Figure 5A:
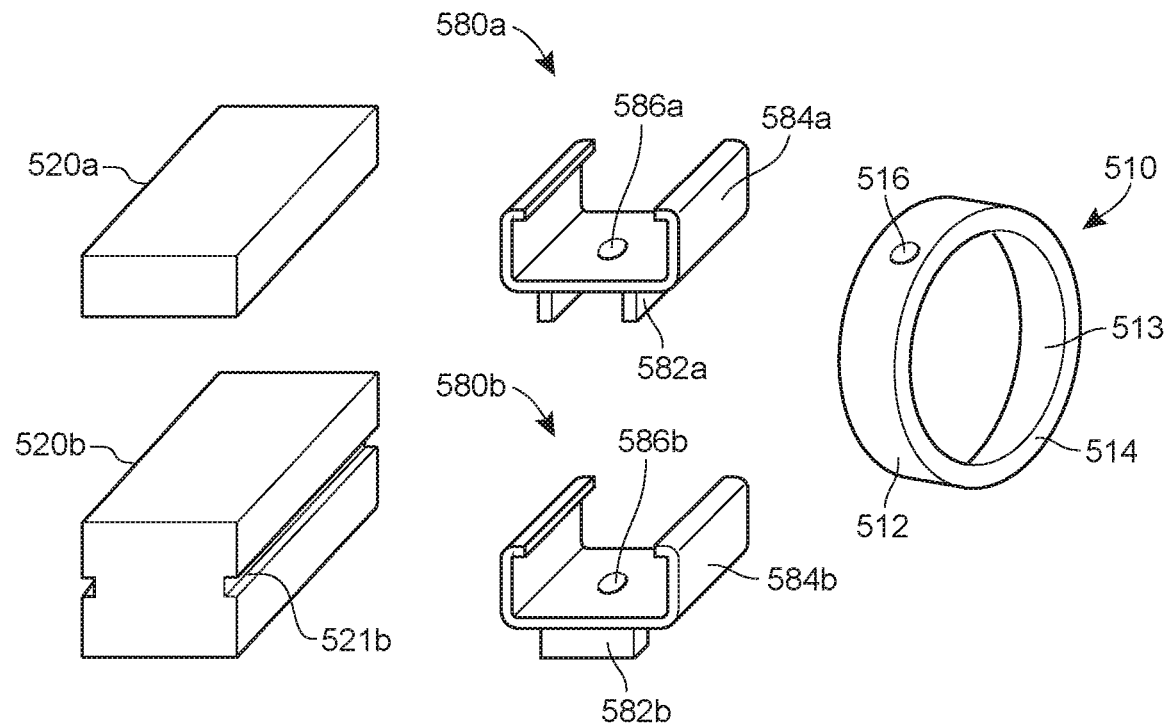
FIG. 5A, FIG. 5B, FIG. 5C, and FIG. 5D illustrate assembled configurations (in FIG. 5B and FIG. 5D) and corresponding constituent components (in FIG. 5A and FIG. 5C) of smart rings that include removable power sources according to some embodiments.
Figure 5B:
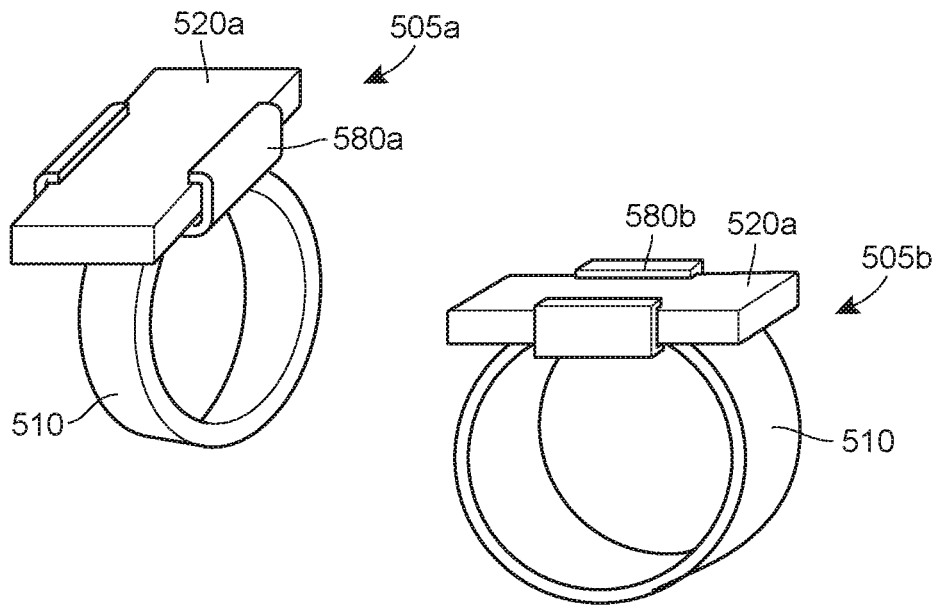
Figure 5C:
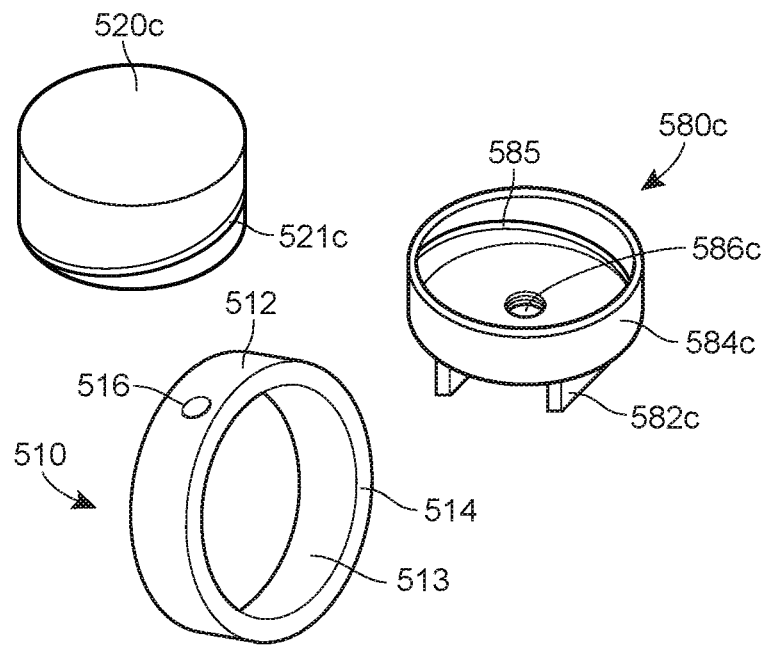
Figure 5D:
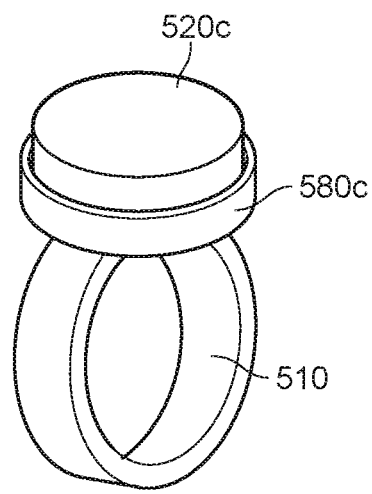

FIG. 5B illustrates two smart ring configurations 505*a* and 505*b* including the housing 510 and the removable power source 520*a*. Adapter 580*a* in configuration 505*a* leads to a different configuration geometry than adapter 580*b* in the configuration 505*b*. Using the removable power source 520*b* in lieu of the removable power source 520*a* may lead to additional configurations. Any removable power source compatible with the adapter 580*c* may replace the removable power source 520*c* in the configuration 505*c* of FIG. 5D. Generally, as discussed above, adapters for removable power sources may increase flexibility and choice of configurations vis-à-vis adapters that are integrated into removable power sources.

In operation, configurations 505*a*, 505*b*, and/or 505*c* may allow the components disposed within the band-shaped housing 510 to use energy stored within corresponding removable power sources 520*a*, and/or 520*c*. As discussed above, some components disposed within the band-shaped housing 510 may draw energy from the internal power source; which in turn may draw energy from the corresponding removable power source (one of 520*a*, 520*b*, and/or 520*c*).

In some implementations, the smart ring may be configured to operate in one of a plurality of power modes. Selecting an operating power mode may be based at least in part upon whether a removable power source (e.g., one of 520*a*, 520*b*, and/or 520*c*) is disposed at the band-shaped housing 510 and charging the internal power source.

A method of operating a smart ring (e.g., the smart ring 101, 405 or smart rings in configurations 505*a*, 505*b*, and/or 505*c*) may include detecting that a removable power source (e.g., one of the removable power sources 520*a*, 520*b*, and/or 520*c*) is disposed at an outer surface of a housing (e.g., the housing 510). The detection may include detecting that the removable power source is supplying energy to the internal power source of the smart ring. In response to detecting the removable power source at the housing, a controller (e.g., the controller 140) may switch the smart ring into an operating mode that consumes energy at a higher rate (than when the external power source is not detected) to perform certain functions of the smart ring. The operating mode of the smart ring configuration with a removable power source (e.g., configurations 505*a*, 505*b*, and/or 505*c*) that consumes energy at the higher rate may be referred to as a high-power mode.

For example, the controller of the smart ring may activate a communication unit (e.g., communication unit 160) or input and output units (e.g., user input unit 170, output unit 190) when operating in the high-power mode. In some implementations; the smart ring may sense and log (e.g., in the memory unit 144) biometric or movement information using one or more sensors (e.g., sensors 150). Upon detecting (e.g., by the sensor disposed within or at the housing 510) that the removable power source is connected to the housing 510, the controller may activate the communication unit that may initiate advertising a connection for the purpose of transferring the logged data. Additionally or alternatively, the controller may activate, in response to the sensor detecting that the removable power source is present at the band-shaped housing 510, a display or another output device. The output device may then communicate information based at least in part upon the logged data with the user.

In some implementations, the method may include detecting that the removable power source is not connected to the smart ring and, in response, switching the smart ring into a low-power mode. The low-power mode may include reduced smart ring functionality, for example, to only sensing, as described above. In other implementations, the low power mode may include only maintaining the state (e.g., volatile memory) of the control unit while a user replaces the removable power source. Generally, multiple power modes may be configured depending on the energy resources available to the smart ring. Transitions between some of the power modes may depend on detecting changes to the connection of the removable power source to the smart ring.

The removable power source (e.g., any of 520*a*, 520*b*, and/or 520*c*) may connect to the housing (e.g., the housing 510) via an adapter (e.g., the adapters 580*a*, 580*b*, and/or 580*c*) as discussed above. In some implementations, detecting whether the removable power source is connected to the smart ring may be mediated by the adapter. For example, deformation in the adapter or a change in conductivity between two points of the adapter may be sensed to detect the presence of the removable power source.

Generally, an adapter may facilitate a mechanical connection, an electrical connection, or a communicative connection between the removable power source and the band shaped housing with the internal power source. Furthermore, the adapter may facilitate sensing whether the removable power source is connected.

Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, in certain examples, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium, if desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A smart ring comprising:
a band-shaped housing, including:
an internal power source; and
a component configured to draw energy from the internal power source, and to perform at least one of:
sense a physical phenomenon external to the band-shaped housing,
send communication signals to a communication device external to the band-shaped housing, or
implement a user interface;
wherein the internal power source is configured to be charged by a removable power source disposed as a platform coupled to an outer surface of the band-shaped housing via a mechanical connector.

2. The smart ring of claim 1, further comprising:
an adapter configured to attach simultaneously to both:
the band-shaped housing, and the removable power source.

3. The smart ring of claim 2, wherein:
the internal power source is configured to receive charge via an electrical connection with the removable power source via the adapter.

4. The smart ring of claim 1, further comprising:
a sensor, disposed within the band-shaped housing, configured to detect whether the removable power source is disposed at the outer surface of the band-shaped housing.

5. The smart ring of claim 4, wherein the component is configured to implement the user interface in response to the sensor detecting that the removable power source is present at the band-shaped housing.

6. The smart ring of claim 4, wherein the component is configured to operate in a low-power mode when the sensor detects that the removable power source is not present at the band-shaped housing.

7. The smart ring of claim 1, wherein the removable power source comprises a power transmitter configured to wirelessly charge the internal power source.

8. The smart ring of claim 1, wherein the smart ring further comprises: an energy-harvesting component.

9. The smart ring of claim 8, wherein the energy-harvesting component is disposed at or within the band-shaped housing.

10. The smart ring of claim 8, wherein the energy-harvesting component is disposed at or within the removable power source.

11. A method of operating a smart ring comprising:
transferring electrical energy to an internal power source disposed within a band-shaped housing of the smart ring from a removable power source disposed as a platform coupled to an outer surface of the band-shaped housing via a mechanical connector;

drawing electrical energy from the internal power source by a component disposed within the band-shaped housing; and performing, by the component, at least one of:
sensing a physical phenomenon external to the band-shaped housing,
sending communication signals to a communication device external to the band-shaped housing, or
implementing a user interface.

12. The method of claim 11, wherein attaching, to the band-shaped housing of the smart ring, the removable power source comprises:
removably attaching an adapter to the band-shaped housing; and
removably attaching the removable power source to the adapter to thereby dispose and align the removable power source as the platform at the outer surface of the band-shaped housing.

13. The method of claim 12, wherein transferring the electrical energy from the removable power source to the internal power source comprises:
transferring electric charge from the removable power source to the internal power source via an electrical interface of the adapter.

14. The method of claim 11, wherein transferring the electrical energy from the removable power source to the internal power source comprises:
wirelessly transmitting the energy via a power transmitter disposed at the removable power source.

15. The method of claim 11, further comprising:
detecting, by a sensor, whether the removable power source is disposed at the band-shaped housing.

16. The method of claim 15, wherein transferring the electrical energy from the removable power source to the internal power source comprises:
wirelessly transmitting the energy via a power transmitter disposed at the removable power source and in response to detecting by the sensor that the removable power source is disposed at the band-shaped housing.

17. The method of claim 15, further comprising:
operating the smart ring in a low-power mode in response to detecting by the sensor that the removable power source is not disposed at the band-shaped housing.

18. The method of claim 15, further comprising:
sending the communication signals to the communication device external to the band-shaped housing in response to detecting by the sensor that the removable power source is disposed at the band-shaped housing.

19. The method of claim 15, further comprising:
implementing the user interface in response to detecting by the sensor that the removable power source is disposed at the band-shaped housing.

20. The method of claim 11, further comprising:
harvesting, by an energy harvesting component disposed at the removable power source, energy for charging the internal power source of the smart ring.

* * * * *